United States Patent [19]
Knight

[11] 3,825,192
[45] July 23, 1974

[54] FEEDING MECHANISM FOR REDUCTION APPARATUS

[75] Inventor: Lloyd K. Knight, Columbus, Ohio

[73] Assignee: Jeffrey Galion, Inc., Columbus, Ohio

[22] Filed: Jan. 22, 1973

[21] Appl. No.: 325,885

[52] U.S. Cl.......... 241/186 R, 198/165, 241/189 R, 241/223
[51] Int. Cl............................................ B02c 23/02
[58] Field of Search........ 241/186 R, 189 R, 86, 95, 241/280, 223; 198/164, 165, 57

[56] References Cited
UNITED STATES PATENTS

| | | | |
|---|---|---|---|
| 1,108,163 | 8/1914 | Frick................................... | 198/164 |
| 1,473,633 | 11/1923 | Lea....................................... | 198/57 |
| 2,150,984 | 3/1939 | Near et al......................... | 198/165 X |
| 2,402,849 | 6/1946 | Sensenig............................. | 198/164 |
| 2,496,463 | 2/1950 | Gaddis.............................. | 198/57 X |
| 2,810,467 | 10/1957 | Bogaty................................ | 198/57 |
| 2,907,447 | 10/1959 | Offurt et al......................... | 198/165 |
| 3,622,090 | 11/1971 | Liebman......................... | 241/186 R |
| 3,703,231 | 11/1972 | Montgomery...................... | 198/165 |

FOREIGN PATENTS OR APPLICATIONS

| | | | |
|---|---|---|---|
| 763,912 | 12/1956 | Canada.............................. | 241/280 |

Primary Examiner—Granville Y. Custer, Jr.
Assistant Examiner—Howard N. Goldberg
Attorney, Agent, or Firm—David Young

[57] ABSTRACT

Feeding mechanism to control and regulate the feed of a mass of materials into a reduction apparatus. There is a feeding table on which the materials are moved forwardly to the reduction apparatus. A hold-down is positioned above the feeding table, with its forwardmost end ahead of the feeding table and close to the reduction apparatus. The hold-down engages the materials and also moves the materials forwardly, while holding the mass of materials as the reduction means tears into the mass of materials to reduce the materials to a small product size.

7 Claims, 3 Drawing Figures

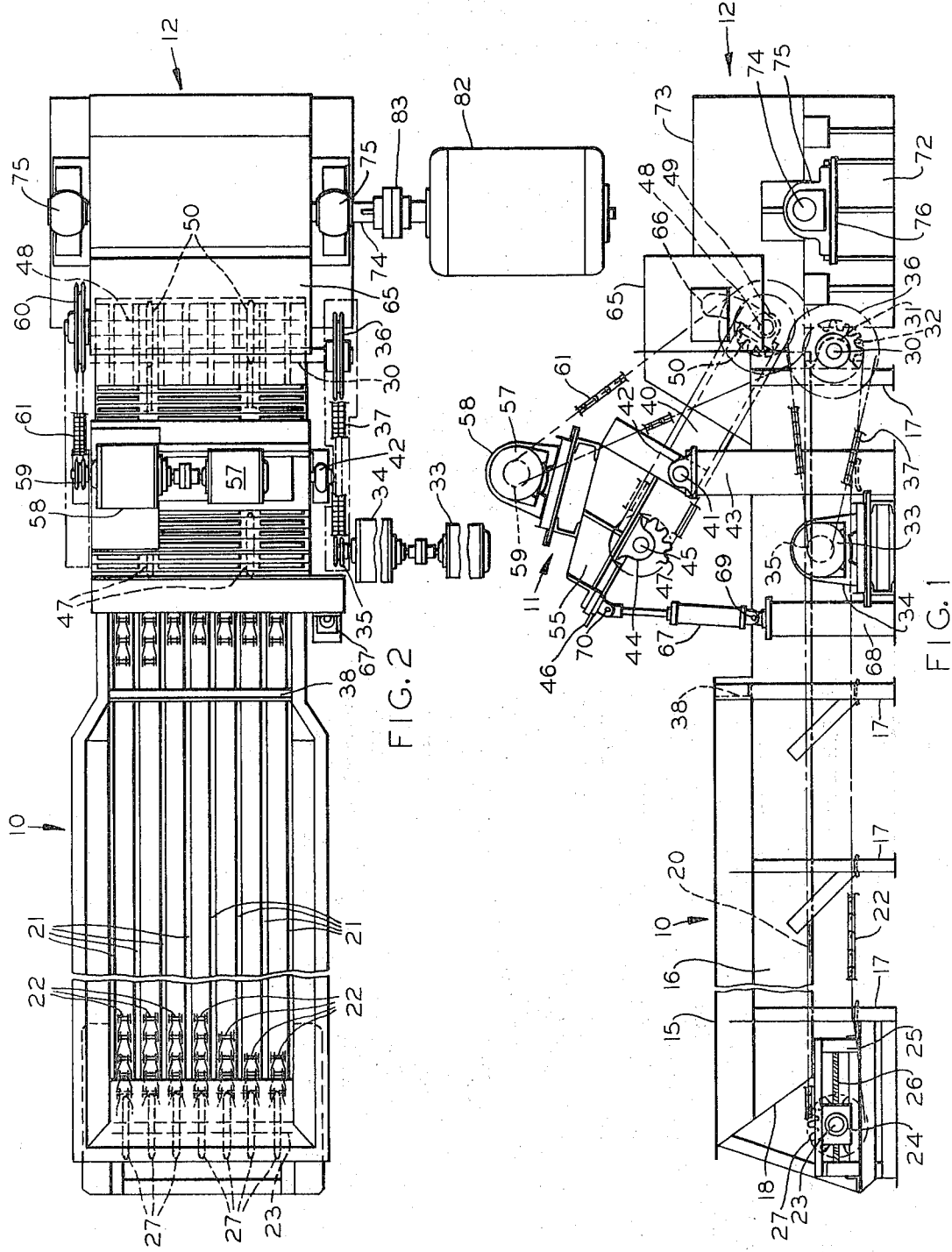

FEEDING MECHANISM FOR REDUCTION APPARATUS

FIELD OF THE INVENTION

This invention relates to a feeding mechanism for feeding a mass of materials, such as a variety of waste materials, in a controlled manner into a reduction apparatus in which such materials are reduced, and then discharged in such reduced form in order to facilitate ultimate disposal of the materials.

DESCRIPTION OF THE PRIOR ART

There are many applications of materials reduction apparatus in which the materials are reduced in size for further use of the reduced product, or for further processing, or for disposal of the product, in the latter instance the materials being waste materials. Customarily, the materials need to be fed into the reduction apparatus in a controlled or regulated manner, so as not to overload the reduction apparatus, which could result in stalling and damage of the equipment.

With the growing awareness of the need to dispose of waste materials in such manner as does not pollute the environment, attention has been given to the use of reduction apparatus for reducing the waste materials to a small product size, in order to facilitate disposal of the materials as by incineration, landfill and other methods. Typical of such waste materials are rolls of paper, loose paper, carboard from various sources, particularly including containers, a variety of plastics, wood pallets, scrap wood, and the like. These materials occur in great quantities and, in their ordinary form, have considerable bulk which is disproportionately large to the actual mass of the materials themselves. This causes difficulty in handling the materials, unless they are reduced to a small product size, which of itself substantially increases the density of the mass of material and facilitates handling the same for ultimate disposition, whether it be by incineration, land-fill operations, dumping or other methods of disposal.

There have been various proposals in the prior art for controlling the feeding of materials into reduction apparatus, so that the latter may effectively work upon such materials. This is exemplified in the patent to Frickey, U.S. Pat. No. 815,087, Mar. 13, 1906. In this patent, the feeding means includes a horizontal endless conveying belt and another endless conveying belt above the first conveying belt, and the material is moved forwardly between the two conveying belts. There are also feed rollers which receive the materials from the endless conveying belts, and these several elements feed the materials in over a triangular bar and into the reduction apparatus for reducing the materals.

SUMMARY OF THE INVENTION

With the growing awareness of the need to dispose of great quantities of waste materials in such a manner as not to pollute the environment, there has been an increasing need for equipment that will handle great quantities of waste materials, and do so in a more efficient manner than had been contemplated in the past.

Therefore, it is a principal object of this invention to provide a feeding mechanism for reduction apparatus which has the capacity to accept and handle a variety of materials in greater quantities and varieties than has been done heretofore, in order to achieve a substantial improvement in the efficiency and effectiveness of the ultimate disposal of such waste materials.

It is another object of this invention to provide an improved feeding mechanism for reduction apparatus in which the materials are delivered to the reduction apparatus in a manner as to facilitate the reduction of the materials.

It is a further object of this invention to provide a feeding mechanism for reduction apparatus in which the feeding mechanism performs a preliminary compaction of the materials as they are fed into the reduction apparatus.

It is still another object of the invention to provide an improved feeding mechanism for reduction apparatus in which the mechanism may be adjuted for different types of materials.

It is still a further object of the invention to provide an improved feeding mechanism for reduction apparatus in which large quantities of materials may be loaded into the feeding mechanism, and the latter then feeds such materials in a controlled and regulated manner to the reduction apparatus so that the latter can reduce the materials in an efficient manner.

It is yet another object of the invention to provide an improved feeding mechanism for reduction apparatus in which there is a hold-down which bears down on the materials at a position that is very close to the reduction apparatus and thereby to feed the materials into the reduction apparatus in a controlled and regulated manner.

Other objects of the invention will appear hereinafter, the novel features and combinations being set forth in the appended claims.

BRIEF DESCRIPTION OF THE DRAWINGS

In the accompanying drawings:

FIG. 1 is a side elevational view of the feeding mechanism and the reduction apparatus.

FIG. 2 is a plan view of the feeding mechanism and the reduction apparatus.

DESCRIPTION OF THE PREFERRED EMBODIMENT

Figure 3:
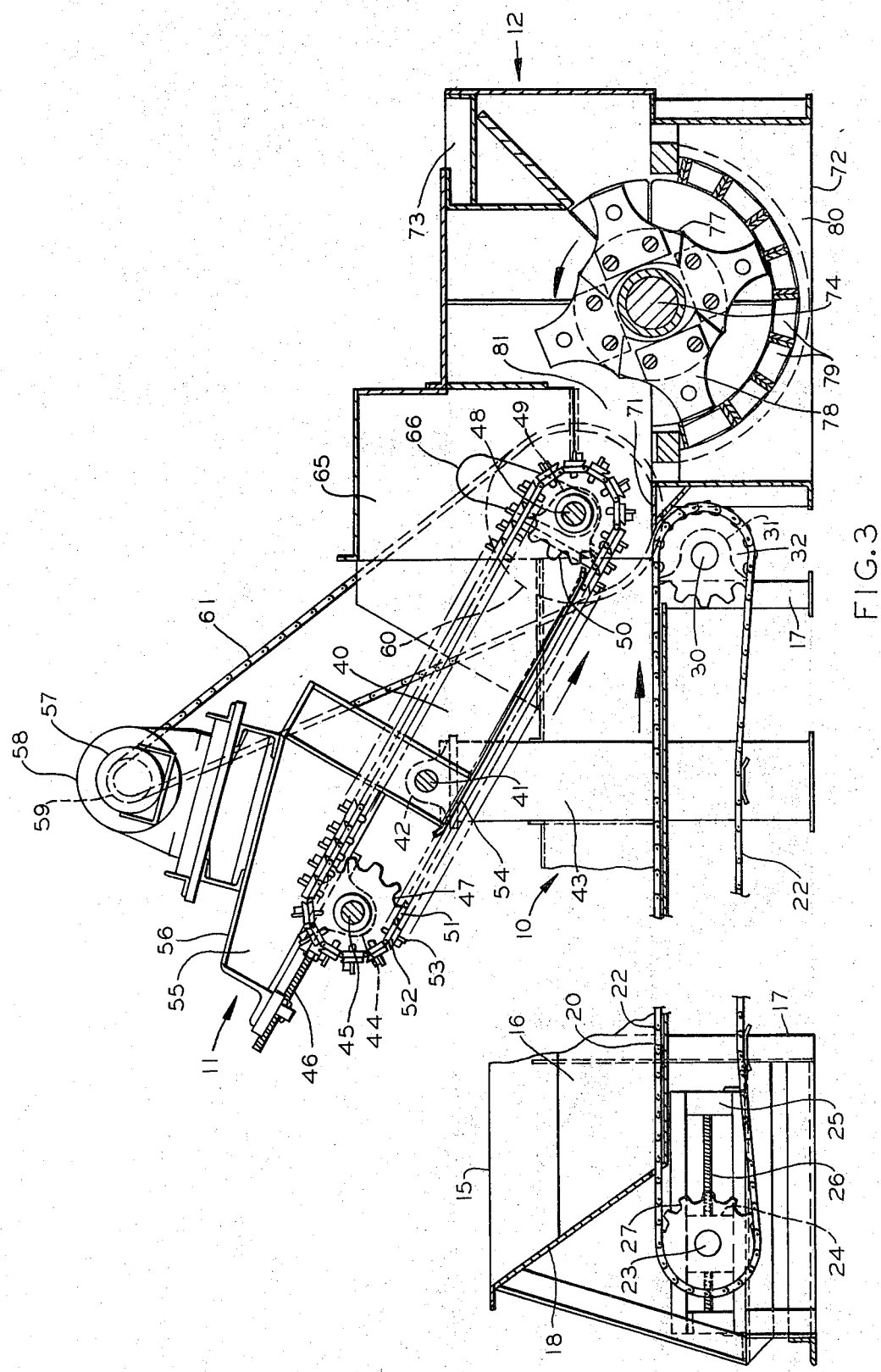
FIG. 3 is a longitudinal sectional view of a portion of the feeding mechanism and the reduction apparatus, which is enlarged.

Referring to the drawings, there is illustrated the feeding mechanism which has a laterally extending feeding table 10 which is horizontally disposed, and a hold-down 11 which is also laterally disposed above the forward end of the feeding table 10, and is inclined downwardly towards the forward end of the feeding table 10. Forwardly beyond the feeding table 10 and the hold-down 11, there is the reduction apparatus 12, which receives the materials and works them to a reduced product which is discharged.

The feeding table 10 has a hopper 15 at its rearward end, into which the materials may be dumped indiscriminately and from which the materials are fed fowardly to the reduction apparatus 12. There are upright sidewalls on each side of the feeding table 10 which extend down from the hopper 15 and extend to the reduction apparatus 12 to contain the materials on the feeding table 10. The feeding table 10 is supported on several upright legs 17,17, which are secured to the hopper 15 and to the sidewalls 16, as by welding, on both sides. The rear end of the feeding table 10 is closed by wall 18 that forms the rear end of the hopper 15.

The feeding table 10 has a laterally extending table part 20 which is horizontally diposed between the walls 16, extending towards the reduction apparatus 12. There are several laterally spaced rails 21,21 secured to the surface of the table part 20, as by welding, and forming channels or tracks therebetween on the table part 20. The rails 21, 21 extend the length of the table part 20, and the channels or tracks between the rails 21, 21 are of the same length. A chain 22 is disposed in each channel or track formed between the rails 21, 21. Each chain 22 is endless and, in its operative run, it moves on the surface of the table part 20 between two rails 21, 21. At the rearward end of the feeding table 10 there is a cross-shaft 23 rotatably mounted in bearings 24, 24 disposed one at each side of the feeding table 10. Each bearing 24 is slidably supported in a take-up 25 which includes a screw 26 by which the position of the shaft 23 may be adjusted to take up the slack in the several chains 22, 22. Several sprockets 27, 27 are secured to the shaft 23 for rotation therewith, and each sprocket 27 engages a respective chain 22.

At the forward end of the feeding table 10, there is a shaft 30 rotatably mounted in bearings 31, 31 which are one at each side of the feeding table 10, and secured to upstanding legs 17, 17. Several sprockets 32, 32 are secured to the shaft 30 at laterally spaced positions corresponding to the several chains 22, 22. Each sprocket 32 is engaged with a chain 22 to drive the latter.

A motor 33 is coupled to a gear reducer 34 and drives the double drive sprocket 35. The drive sprocket 35 is connected to a double driven sprocket 36 by a two-strand drive chain 37. The driven sprocket 36 is secured to the end of the shaft 30 which projects from a bearing 31, and drives the shaft 30 and the several sprockets 32, 32, which in turn drive the chains 22, 22 along the table part 20 of the feeding conveyor 10.

Each of the chains 22, 22 is slightly higher than the rails 21, 21 so that the chains 22, 22 will contact the materials which are dumped into the hopper 15. Thus, the several chains 22, 22 form live conveying elements in the feeding table 10 for feeding the materials forwardly from the hopper 15 towards the reduction apparatus 12. A strike-off bar 38 is placed forwardly of the hopper 15 at about the height of the sidewalls 16, 16 and limits the volume of materials that moves forwardly from the hopper 15, by blocking the materials above the height of the sidewalls 16, 16. As the materials feed forwardly on the feeding table 10 and reach the forward end of the latter, the materials meet the hold-down 11.

The hold-down 11 has a frame 40 with shafts 41,41 disposed one at each side, and each is pivotally received in a bearing 42 that is secured to the top of a supporting post 43. There is a supporting post 43 at each side of the feeding table 10 and secured to the feeding table 10, as by welding, to support the feeding table 10 as well as the hold-down 11. The hold-down frame 40 is pivotable in an upright plane about the axis of the shafts 41,41.

At the rearward end of the hold-down frame 40, there are bearings 44,44 disposed one at each side, and rotatably supporting a cross-shaft 45. Each bearing 44 is slidably mounted on the hold-down frame 40, and is adjustable by means of a screw 46 to provide a take-up.

Two sprockets 47,47 are secured to the cross-shaft 45 and are rotatable with the latter.

At the forward end of the hold-down 11, there is a cross-shaft 48 which is rotatably mounted in bearings 49,49 that are secured to the frame 40, one at each side of the latter. Sprockets 50,50 are secured to the cross-shaft 48 and are rotatable with the latter. The hold-down 11 has an endless chain and flight feeding means, engaged with the sprockets 47,47 and the sprockets 50,50, and driven by the latter sprockets. The endless chain and flight feeding means has two endless chains 51,51 each engaged with a sprocket 47 and a sprocket 50. There are a plurality of cross-flights 52,52 corresponding in number to the number of chain links in each endless chain 51. Each cross-flight 52 is secured to a corresponding link in each of the chains 51,51, preferably by bolts and nuts, in order to facilitate change and replacement whenever this may be needed. The cross-flights 52,52 have projecting teeth 53,53. The teeth 53,53 bite into the materials on the feeding table 10 and effectively seize the materials in order to control and to regulate the feeding of the materials into the reduction apparatus 12. There is a backing plate 54 on the hold-down frame 40 to give back-up support to the chains 51,51 and the cross-flights 52,52 as the teeth 53,53 of the latter engage and bite into the materials.

The hold-down frame 40 has an upper structure 55 with a platform 56 on which there is secured a motor 57 that is coupled to a gear reducer 58 to drive a double drive sprocket 59. A double driven sprocket 60 is secured to a projecting end of the shaft 48 and a double strand drive chain 61 connects the drive sprocket 59 to the driven sprocket 60 to drive the latter and thereby to rotate the cross-shaft 48 with the sprockets 50,50. The chains 51,51 are driven by the sprockets 50,50. The chains 51,51 may be adjusted and taken up by means of the screws 46,46 by which the position of the bearings 44,44 is adjusted. Such take-up and adjustment of the chains 51,51 may be needed from time to time as the latter wear.

The forward end of the feeding table 10 and the forward end of the hold-down 11 extend into an upper front housing 65 of the reduction apparatus 12. At the one side, the housing has an arcuate slot 66 for the projecting end of the shaft 48 and this allows freedom of movement of the forward end of the hold-down 11 upwardly and downwardly about the axis of the shafts 41,41. An extensible and retractable cylinder 67 is connected to the top of a post 68 by a pin 69, and is connected to the rearward end of the upper hold-down structure 55 by a pin 70. The cylinder 67 may be pneumatically operated, and is its extended position, as illustrated in FIGS. 1 and 3, the forward end of the hold-down is in its lowest position. In the retracted condition of the cylinder 67, the forward end of the hold-down 11 will be in its highest position, which places the cross-shaft 48 near the top of the slot 66. The position of the forward end of the hold-down 11 may be adjusted by means of the cylinder 67, to accommodate the different types and quantities of materials. Thus, for a denser mass of materials, it may be desired to raise the forward end of the hold-down 11. The same may also be done for materials that are harder and do not lend themselves to being compacted. In feeding a mass of materials that is less dense, or is softer, the hold-down 11 may be adjusted to a lower position, or left free in its lowest position from which it will seek its own position in accordance with the mass of materials.

As best seen in FIG. 3, the forwardmost end of the hold-down 11 is located ahead of the forwardmost end of the feeding table 10, thereby placing the forwardmost end of the hold-down 11 very close to the operating elements of the reduction apparatus 12. There is a fixed table part 71, which is formed in the lower housing 72 of the reduction apparatus 12. The fixed table part 71 effectively forms a fixed extension of the table part 20 of the feeding table 10. However, the fixed table part 71 is located directly below the forwardmost end of the hold-down 11. The hold-down 11 works with the fixed table part 71 to control and to regulate the feeding of the materials into the reduction apparatus 12.

The reduction apparatus 12 has a lower housing 72 which forms a supporting base for the elements. Upper front housing 65 is above the lower housing 72 and extends towards the feeding table 10 and the hold-down 11 to receive the forward ends of the latter. The housing structure of the reduction apparatus 12 is completed by the upper housing 73 which is placed above the lower housing 72 and behind the upper front housing 65. A rotor shaft 74 extends laterally through the opposite sides of the reduction apparatus 12 and is rotatably supported in bearings 75,75 one at each side. Each bearing 75 is secured to a support 76 on the lower housing 72.

A rotor 77 is secured to the shaft 74 in the reduction apparatus 12, and the axis thereof is level with the working surface of the table part 20. A plurality of radially extending hammers 78,78 or other reduction elements, are secured to the rotor 77 at circumferentially and axially spaced positions, and these hammers or reduction elements 78,78 work on the materials that are fed into the reduction apparatus 12 to reduce such materials to a smaller sized product. A motor 82 is connected to the shaft 74 of a coupling 83 to drive the motor 77.

In the lower housing 72, there are several screen bars 79,79 which are disposed in a circular arc at the operating circumference of the hammers 78,78. The screen bars 79,79 are formed with small openings through which the reduced materials drop and then discharge through the large opening 80 in the bottom of the lower housing 72. The reduced size of the materials from the reduction apparatus 12 is governed by the size of the openings in the screen bars 79,79.

In the operation of the feeding mechanism, the materials, which are to be reduced in the reduction apparatus 12, are indiscriminately dumped into the hopper 15 of the feeding table 10. The chains 22,22 move the materials forward towards the reduction apparatus 12. In the course of moving the materials forward from the hopper 15, the strike-off bar 38 trims off the materials and limits the mass of materials that move beyond the strike-off bar 38, to about the height of the sidewalls 16,16. When the mass of materials reaches the forward end of the feeding table 10, the materials meet and pass under the hold-down 11.

The position of the hold-down 11 is adjustable upwardly and downwardly about the axis of the shafts 41,41 by the cylinder 67. Thus, the forward end of the hold-down 11 may be positioned close to the level of the working surface of the table part 20 of the feeding table 10, or it may be raised to provide a greater vertical spacing, but limited by the available stroke of the cylinder 67. The cylinder 67 is preferably a pneumatic cylinder which is pressurized with air.

There are several options available in the utilization of the pneumatic cylinder 67. In the position of the elements as illustrated in FIG. 1, the base end of the cylinder 67 may be pressurized with air under pressure which thereby supplies a force urging the forward end of the hold-down 11 downwardly. Then the materials pass under the hold-down 11, there will be the additional force due to the pressurization of the cylinder 67 to act on the mass of materials for compacting these as they approach the reduction apparatus 12.

Another option in the utilization of the cylinder 67 is to leave it without any pressure. In this condition, the hold-down 11 will assume the position illustrated in FIG. 1 by reason of its own weight distribution which is over-balanced in the forward direction of the hold-down 11. This may be augmented by weights secured in the forward part of the hold-down frame 40. This weight may be selected to suit the character of the materials that are fed through the feeding table 10 and the hold-down 11. The weight of the motor 57 and the gear reducer 58, as well as the upper structure 55, function as a counterbalance to the weight of that part of the hold-down 11 which is to the right of the shafts 41,41 as viewed in FIGS. 1 and 3.

Another option in the use of the pneumatic cylinder 67 is to supply air under pressure to the rod end of the cylinder 67, with the effect to raise the forward end of the hold-down 11 from the level of the table part 20 of the feeding table 10. In this condition, the passage beneath the forward end of the hold-down 11 is opened up, and the waste materials then pass through below the hold-down 11 with a lesser degree of compaction than is the case when the hold-down is in its lowest position.

The hold-down 11 effectively floats, whether air pressure is supplied or is not supplied to the base end of the cylinder 67, and can be moved upwardly by the mass of waste materials that pass below the hold-down 11. If there is pressure in the base end of the cylinder 67, then the air is further compressed due to retracting the cylinder 67 when the forward end of the hold-down 11 is raised, which increases the pressure of the air and tends to force the hold-down 11 against the materials with greater force. When the rod end of the cylinder 67 is pressurized, and the materials tend to move the hold-down 11 upwardly, this reduces the pressure of the air in the cylinder 67 by retracting the latter, and the unbalanced weight of the forward side of the hold-down 11 bears on the mass of material, tending to compact the materials and permitting the hold-down to tend to return to its originally preselected position.

The cylinder 67 is also useful for raising the forward end of the hold-down 11 to its highest position to provide access to other elements for repairs, servicing and other maintenance.

As the materials move forwardly on the feeding table 10 and pass into the area of the hold-down 11, the materials are engaged by the cross-flights 52,52 of the chains 51,51 on the hold-down 11, and the teeth 53,53 of the cross-flights 52,52 bite into the materals and begin to work together with the chains 22,22 of the feeding table 10. The chains 22,22 in the feeding table 10, and the chains 51,51 with the cross-flights 52,52 of the hold-down 11 are driven at the same linear speed, and thus, there is no action between the feeding table 10 and the hold-down 11, tending to turn or tear the materials. Rather, there is a simple and uniform feeding action between the feeding table 10 and the hold-down 11 to feed the mass of materials into the reduction apparatus 12 in a controlled and regulated manner.

In the course of feeding the mass of materials, the latter passes beyond the forward end of the feeding table 10. The hold-down 11 extends fowardly of the feeding table 10, and particularly the forwardmost ends of the several chains 22,22 as these travel around the sprockets 32,32. As the mass of materials passes beyond the forwardmost end of the feeding table 10, it moves onto the fixed table part 71. The chains 51, 51 and their cross-flights 52, 52 are still in engagement with the mass of materials, and are backed by the fixed table part 71. In this area of operation, there is the greatest compaction and holding action of the materials by the hold-down 11. The teeth 53, 53 of the cross-flghts 52, 52 have bitten into the mass of materals and hold the materials in this area. The fixed table part 71 is very close to the feed opening 81 in the upper front housing 65 and the upper housing 73.

The mass of materials, having been somewhat compacted by the hold-down 11, are held at the feed opening 81 very close to the rotor 77 and the hammers 78,78. The rotor 77 rotates in a counter-clockwise direction and works on the mass of materials at the opening 81, tearing away at these materials as the latter continue to be moved into the feed opening 81 by the chains 51,51 and the cross-flights 52, 52 of the hold-down 11. After the materials are initially torn from the mass of materials, these are further worked upon by the hammers 78, 78 within the reduction apparatus 12, until these materials are reduced to a product size which will pass through the openings of the screen bars 79, 79 and discharge through the opening 80 in the bottom of the lower housing 72.

The feeding mechanism which is described herein has been found to be particularly effective for handling large masses of materials, permitting efficient reduction and economic disposal of these materials. It is a characteristic of this feeding mechanism that the reduction apparatus can be fully utilized to reduce the materials to a smaller product size in which the mass of materials has a substantially higher density than the original mass of materials. When used to reduce waste materials, such materials in the reduced condition can be efficiently incinerated or effectively used in land-fill, or disposed of by other methods. The feeding mechanism and reduction apparatus can also be used to reduce other materials than wastes.

Obviously those skilled in the art may make various changes in the details and arrangement of parts without departing from the spirit and scope of the invention as defined by the claims hereto appended, and I wish therefore not to be restricted to the precise construction herein dislose.

Having thus described and shown an embodiment of the invention, what it is desired to secure by letters Patent of the United States, is:

1. Feeding means for delivering a mass of materials into reduction apparatus in which such materials are reduced and the reduced product is discharged, a rotor in said reduction apparatus with its axis extending in a lateral direction, reduction elements on said rotor and extending radially to contact said mass of materials as the rotor rotates and to tear portions of the materials from the mass of materials and to work the materials until the materials are reduced to a smaller sized product that is discharged from the reduction apparatus, a feeding table that is laterally disposed and is directed towards the axis of said rotor, endless traveling feeding means on said feeding table to move the mass of materials towards the reduction apparatus, a hold-down above the feeding table and extending laterally towards the reduction apparatus, endless traveling feeding means on said hold-down to move the mass of materials into the reduction apparatus and moving at the same rate of speed as the feeding means of the feed table, means to support said hold-down with the forward end thereof located forwardly of the feed table feeding means and to bear down on the mass of materials close to the reduction elements of the rotor, said hold-down support means including pivot means to pivotally supported the hold-down with the major part of the weight of the hold-down being disposed forwardly of the pivot means to cause the hold-down to bear down on the mass of materials, limit means connected to said hold-down to limit the downward movement of said hold-down against the mass of materials, said limit means comprising an extensible and retractable cylinder to adjust the position of the hold-down about said pivot means and to set the position of the forward end of the hold-down against the mass of materials 2. Feeding means for delivering a mass of materials onto reduction apparatus as recited in claim 1, in which said extensible and retractable cylinder is fluid operated and is pressurized by a fluid medium to set the position of the forward end of the hold-down.

3. Feeding means for delivering a mass of materials into reduction apparatus as recited in claim 2, in which said extensible and retractable cylinder is pneumatically operated and thereby is yieldable and the position of the hold-down is responsive to the bulk of the material that is delivered to the reduction apparatus.

4. Feeding means for delivering a mass of materials into reduction apparatus in which such materials are reduced and the reduced product is discharged, a rotor in said reduction apparatus with its axis in a horizontal position, reduction elements on said rotor and extending radially to contact said mass of materials as the rotor rotates and to tear portions of the materials from the mass of materials and to work the materials until the materials are reduced to a smaller sized product that is discharged from the reduction apparatus, a horizontal feeding table directed toward said rotor in the horizontal plane of the rotor axis, endless traveling chain feeding means on said feeding table to move the mass of materials forwardly towards the reduction apparatus, a hold-down above said feeding table and extending forwardly towards the reduction apparatus, endless traveling chain and flight feeding means on said hold-down to move the mass of materials into the reduction apparatus and moving at the same rate of speed as the feeding means of the feed table, means to support said hold-down with the forward end thereof forwardly of the forward end of the feed table feeding means to bear down on the mass of materials close to the reduction elements of the rotor, a fixed table part forming an extension of the forward end of the horizontal feeding table and disposed below the forward end of the hold-down close to the reduction elements of the rotor, said means to support said hold-down includes pivot means to mount the hold-down, the weight of said hold-down being distributed on opposite sides of said pivot means and a major part of the weight of the hold-down being disposed forwardly of the pivot means to urge the hold-down downwardly to engage and to bear on the mass of materials, an extensible and retractable cylinder connected to said hold-down to set the position of the hold-down about said pivot means in order to adjust the position of the hold-down relatively to said feeding table and against the mass of materials that is disposed between the hold-down and the fixed table part.

5. Feeding means for delivering a mass of materials into reduction apparatus as recited in claim 4, in which said extensible and retractable cylinder is a pneumatically operated cylinder in which pressure can be applied to one side of the cylinder to set the position of the hold-down and to urge the hold-down to such position and pressure can be applied to the other side of the cylinder to counterbalance the unbalanced weight of the hold-down and permitting the hold-down to adjust its position in response to the bulk of the mass of materials which is engaged by the hold-down against said fixed table part.

6. Feeding means for delivering a mass of materials into reduction apparatus in which such materials are reduced and the reduced product is discharged, a rotor in said reduction apparatus with its axis in a horizontal position, reduction elements on said rotor and extending radially to contact said mass of materials as the rotor rotates and to tear portions of the materials from the mass of materials and to work the materials until the materials are reduced to a smaller sized product that is discharged from the reduction apparatus, a horizontal feeding table directed toward said rotor in the horizontal plane of the rotor axis, endless traveling chain feeding means on said feeding table to move the mass of materials forwardly towards the reduction apparatus, a hold-down above said feeding table and extending forwardly towards the reduction apparatus, endless traveling chain and flight feeding means on said hold-down to move the mass of materials into the reduction apparatus and moving at the same rate of speed as the feeding means of the feed table, means to support said hold-down with the forward end thereof forwardly of the forward end of the feed table feeding means to bear down on the mass of materials close to the reduction elements of the rotor, a fixed table extension of said feeding table disposed below the forward end of said hold-down and close to said reduction element on the rotor so that the mass of materials is held between the hold-down and said fixed table extension as the reduction elements tear portions of the materials from the mass of materials.

7. Feeding means for delivering a mass of materials into reduction apparatus as recited in claim 6, in which the reduction apparatus has a housing to enclose said rotor and said reduction elements, a feed opening in said housing to receive the forward end of the feeding table and the forward end of said hold-down, and said fixed table extension of the feeding table being disposed in said housing in the feed opening thereof.

* * * * *